US005557935A

United States Patent [19]
Ganzel

[11] Patent Number: 5,557,935
[45] Date of Patent: Sep. 24, 1996

[54] APPLY-RATE-INDEPENDENT FAST-FILL MASTER CYLINDER

[75] Inventor: Blaise J. Ganzel, Ann Arbor, Mich.

[73] Assignee: Kelsey-Hayes Company, Livonia, Mich.

[21] Appl. No.: 447,360

[22] Filed: May 23, 1995

[51] Int. Cl.⁶ .................................................. F15B 7/04
[52] U.S. Cl. ............................................................ 60/578
[58] Field of Search ................................................. 60/578

[56] References Cited

U.S. PATENT DOCUMENTS

| | | |
|---|---|---|
| 4,372,117 | 2/1983 | Kobayashi . |
| 4,455,831 | 6/1984 | Maehara ........................................ 60/578 |
| 4,571,944 | 2/1986 | Kubota ........................................... 60/578 |
| 4,745,751 | 5/1988 | Gaiser . |

OTHER PUBLICATIONS

SAE Technical Paper Series No. 830412, Brake Integrated Hydraulic Actuation System Master Cylinder, Roscoe Nash, Jr., Ford Motor Company, Feb. 28–Mar. 4, 1983.

*Primary Examiner*—F. Daniel Lopez
*Attorney, Agent, or Firm*—Brooks & Kushman P.C.

[57] ABSTRACT

A master cylinder having, in addition to a main pressurizing chamber, a fast-fill pressurizing chamber to quickly force, while pedal effort is minimal, brake pads or shoes from initially retracted positions to positions where the pads or shoes are in contact with corresponding brake disks or drums. The present master cylinder uses no fixed brake fluid flow restriction valves to vent brake fluid from the fast-fill pressurizing chamber once contact is made, pedal travel being made thereby independent of the rate of applied pedal effort. The present master cylinder uses a staged inverse proportioning valve, disposed between the fast-fill reservoir main pressurizing chambers, and simultaneously responsive to brake fluid pressures of both the fast-fill and the main pressurizing chambers to vent brake fluid from the fast-fill pressurizing chamber into a brake fluid reservoir as pedal effort begins to increase, thereby moderating the rate of increase of pedal effort so that a minimum of inconsistency in that effort is detectable when the transition from quick take-up to normal master cylinder operation is made.

9 Claims, 2 Drawing Sheets

APPLY-RATE-INDEPENDENT FAST-FILL MASTER CYLINDER

TECHNICAL FIELD

This invention relates generally to vehicle brake master cylinders and specifically to fast-fill master cylinders.

BACKGROUND OF THE INVENTION

Fast-fill, or quick take-up, master cylinders have been used in braking systems of automotive vehicles for some time. Concerns about the performance of such master cylinders include brake pedal travel variations as a function of the application rate of braking force. Another concern involves the inconsistency of pedal feel during transitions from fast-fill pressurizing chamber to standard master cylinder pressurizing chamber fluid delivery.

In a braking system using a standard master cylinder, as force is applied to a brake pedal, a piston within the master cylinder begins to move, increasing the pressure of brake fluid within the braking system. The ratio of pedal effort, or braking force, with respect to pedal travel is relatively low and increases relatively slowly as brake pads or shoes are forced from retracted positions to positions where they make contact with respective brake disks or drums.

The pedal effort that must be exerted to obtain additional pedal travel increases more rapidly thereafter. The increases in brake fluid pressure and in pedal effort are both functions of increases in pedal travel, and both pedal effort and brake fluid pressure increase smoothly in a substantially coincidental and generally exponential manner. In a braking system using a standard master cylinder, the amount of pedal travel is not a function of the rate at which pedal effort is applied.

In a braking system using an existing fast-fill master cylinder, a flow restriction valve is used to provide an alternate path for brake fluid from a fast-fill pressurizing chamber to a brake fluid reservoir. The flow rate of brake fluid through such a flow restriction device is a function of pressure. If force is applied to a brake pedal so rapidly that brake fluid pressure increases before any appreciable amount of fluid can flow through the restriction, pedal travel is relatively minimal.

If, however, force is applied to the brake pedal so slowly that fluid is capable of flowing through the flow restriction device without any appreciable increase in brake fluid pressure, pedal travel can be considerable. Pedal travel in a braking system using an existing fast-fill master cylinder is therefore a function of the rate at which braking force is applied to the pedal.

In the braking system just described, a relief valve is disposed between the fast-fill pressurizing chamber and the brake fluid reservoir of the master cylinder so that, after the brake pads or shoes have been rapidly forced into contact with respective brake disks or drums and the increased brake fluid flow used to accomplish this is no longer needed, the pressure that is then rapidly increasing in the fast-fill pressurizing chamber, with its corresponding rapid increase in pedal effort, can be relieved.

When the relief valve opens, however, the brake fluid pressure and corresponding pedal effort are relatively high. The smooth increase in brake fluid pressure is interrupted, the rate of its increase being sharply reduced. This results in an inconsistent pedal feel during this transition from fast-fill pressurizing chamber to standard master cylinder pressurizing chamber fluid delivery. Following this period, the pedal feel would approximate that of a braking system using a standard master cylinder.

While braking systems using existing fast-fill master cylinders function with a certain degree of efficiency, none disclose the advantages gained by using the improved fast-fill master cylinder of the present invention as is hereinafter more fully described.

DISCLOSURE OF THE INVENTION

An object of the present invention is to provide a master cylinder offering reduced pedal travel variability with respect to the application rate of braking force.

Another object of the present invention is to provide an improved master cylinder yielding a more consistent pedal feel during transition from fast-fill master cylinder pressurizing chamber to standard master cylinder pressurizing chamber brake fluid delivery.

In realizing the aforementioned and other objects, the apply-rate-independent fast-fill master cylinder of the present invention includes an elongate housing having a main axis and a valve axis and having a closed end and an open end. The housing further has a stepped piston bore concentrically disposed along the main axis. The stepped piston bore includes a main bore proximate the closed end and a fast-fill bore proximate the open end. The fast-fill bore has a larger diameter than the main bore. The housing has a main inlet port and a compensation port, which are connectable to a brake fluid reservoir. A main outlet port also extends through the housing into the main bore.

The housing also has a staged inverse proportioning valve bore, which is also stepped and concentrically disposed along the valve axis. It includes a first valve bore portion and a second valve bore portion, and the first valve bore portion has a larger diameter than the second valve bore portion. The housing also has a valve bore inlet port extending between the valve bore and the fast-fill bore, a valve bore outlet port extending between the valve bore and the main bore, and a reservoir return port extending between the valve bore and the reservoir.

A staged inverse proportioning valve body is slidably disposed within the staged inverse proportioning valve bore. The valve body has a leading valve body portion disposed within the first valve bore portion and a trailing valve body portion disposed within the second valve bore portion. The valve body also has an internal valve port extending concentrically therethrough along the valve axis. A valve body valve seat is formed at the location where the internal valve port exits the trailing valve body portion.

A staged inverse proportioning valve ball is fixedly mounted in the housing proximate the valve body valve seat. The valve body is resiliently biased to urge the valve seat against the valve ball to isolate the valve bore inlet port from the reservoir return port. A leading valve seal is disposed circumferentially on the leading valve body portion to isolate the valve bore outlet port from the reservoir return port. A trailing valve seal is disposed circumferentially on the trailing valve body portion to isolate the valve bore inlet port from the valve bore outlet port.

A stepped piston is slidably disposed within the stepped piston bore. The stepped piston has a leading piston portion disposed within the main bore, defining a main pressurizing chamber between the leading piston portion and the closed end of the housing. It also has a trailing piston portion disposed within the fast-fill bore, defining a fast-fill pressurizing chamber between the trailing piston portion and the leading piston portion. The stepped piston is resiliently biased toward the open end of the housing.

A first leading piston seal is disposed circumferentially on the leading piston portion to isolate the main pressurizing chamber from the main inlet port and the fast-fill pressurizing chamber. The first leading piston seal also isolates it from the compensation port when the stepped piston is displaced. A second leading piston seal is disposed circumferentially on the leading piston portion to isolate the fast-fill pressurizing chamber from the main inlet port, the compensation port and the main pressurizing chamber. A trailing piston seal is disposed circumferentially on the trailing piston portion to isolate the fast-fill pressurizing chamber from the open end.

These and other objects, advantages and features of the present invention are readily apparent from the following detailed description of the best mode for carrying out the invention when taken in connection with the accompanying drawings.

BEST MODE FOR CARRYING OUT THE INVENTION

Figure 1:
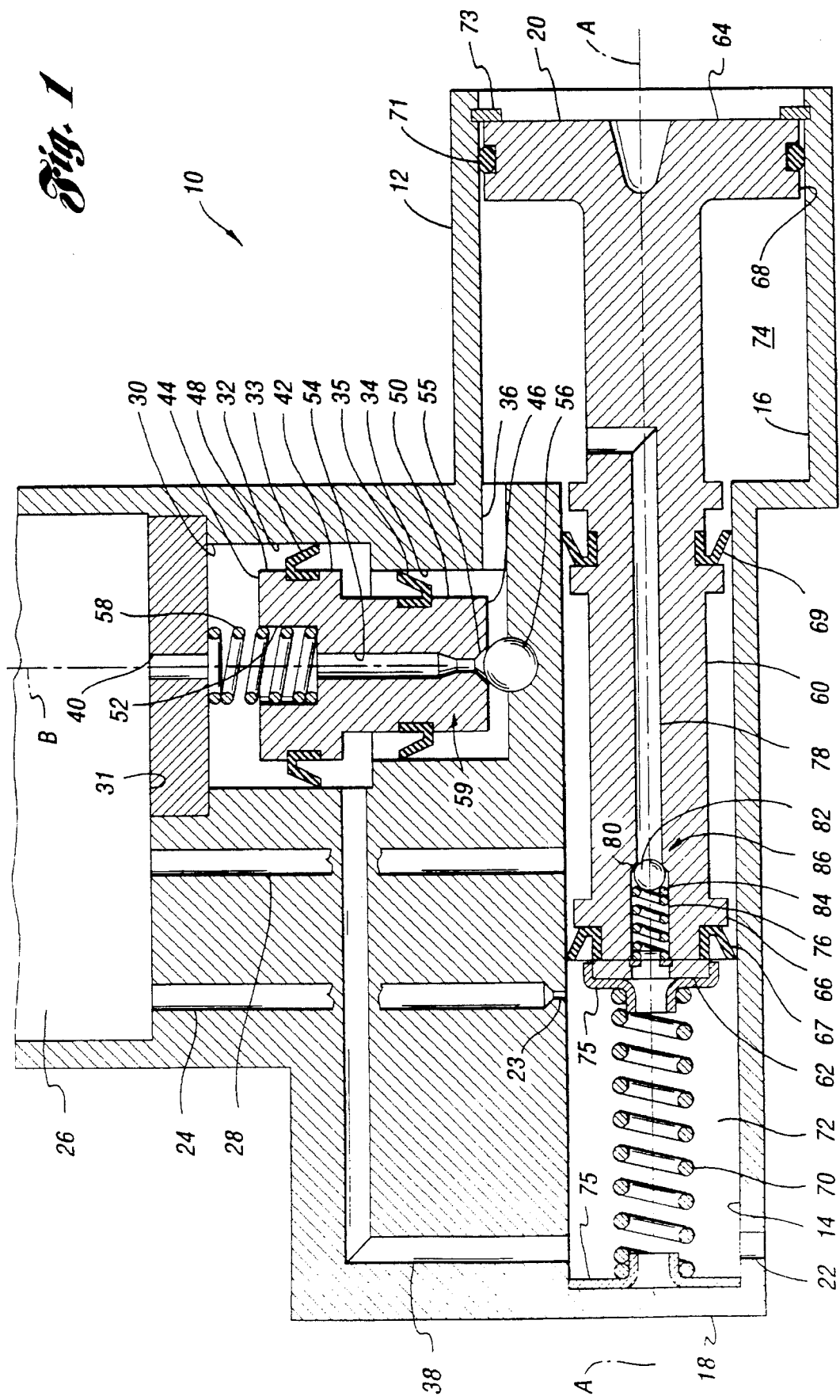
FIG. 1 is a sectional representation of an apply-rate-independent fast-fill master cylinder according to the present invention.

A sectional representation of an apply-rate-independent fast-fill master cylinder 10 according to the present invention is shown by FIG. 1. While an embodiment having a single-piston master cylinder is described and claimed herein, it will be obvious to persons skilled in the art that other embodiments could be used, for example, a tandem master cylinder having two separate pistons.

In the embodiment presently being described, the apply-rate-independent fast-fill master cylinder 10 includes an elongate housing 12 having a main axis A. The housing 12 has therein a longitudinally disposed, stepped piston bore having a main bore 14 and a fast-fill bore 16 concentrically disposed along the main axis A, the housing 12 having a closed end 18 and an open end 20. The fast-fill bore 16 has a greater diameter than that of the main bore 14, the fast-fill bore 16 being proximate the open end 20 of the housing 12 and the main bore 14 being proximate the closed end 18 thereof.

A main outlet port 22 extends through the housing 12 into the main bore 14 proximate the closed end 18. A compensation port 24, which is connectable to a brake fluid reservoir 26, extends through the housing 12 into the main bore 14 at a location farther from the closed end 18 of the housing than is the secondary outlet port 22. The compensating port 24 has a reduced diameter orifice 23 at the point where it intersects the main bore 14. A main inlet port 28, which is also connectable to the brake fluid reservoir 26, extends through the housing 12 into the main bore 14 at a location farther from the closed end 18 of the housing 12 than is the compensation port 24.

The housing 12 also has therein a staged inverse proportioning valve bore 30. The latter is stepped, having a first valve bore portion 32 and a second valve bore portion 34, the first valve bore portion 32 having a larger diameter than that of the second valve bore portion 34. A cap 31 separates reservoir 26 from valve bore 30. The housing 12 further has therein a valve bore inlet port 36 providing communication between the valve bore 30, proximate the second valve bore portion 34 thereof, and the fast-fill bore 16. A valve bore outlet port 38 provides communication between the valve bore 30, proximate the second valve bore portion 34 thereof, and the main bore 14 proximate the closed end 18 of the housing 12. A reservoir return port 40 in cap 31 provides communication between the valve bore 30, proximate the first valve 32 bore portion thereof, and the brake fluid reservoir 26.

A staged inverse proportioning valve body 42 is slidably disposed within the staged inverse proportioning valve bore 30. The valve body 42 has a leading end 44 and a trailing end 46. A leading valve body portion 48 proximate the leading end 44 is disposed within the first valve bore portion 32, and a trailing valve body portion 50 proximate the trailing end 46 is disposed within the second valve bore portion 34.

The leading valve body portion 48 has a diameter slightly smaller than that of the first valve bore portion 32. A leading valve seal 33, such as a lip seal, disposed in an annular recess in the periphery of the leading valve body portion 48, prevents brake fluid from the valve bore inlet port 36 and from the valve bore outlet port 38 from reaching the reservoir return port 40. The trailing valve body portion 50 has a diameter slightly smaller than that of the second valve bore portion 34. A trailing valve seal 35, such as a lip seal, disposed in an annular recess in the periphery of the trailing valve body portion 50, prevents brake fluid from the outlet port 38 from reaching the valve bore inlet port 36.

The leading valve body portion 48 has a valve body recess 52 therein extending from the leading end 44, and an internal valve port 54 communicates between the valve body recess 52 and the trailing end 46 of the valve body 42. A valve body valve seat 55 is defined at the point the internal valve port 54 reaches the valve body trailing end 46. A staged inverse proportioning valve ball 56 is fixedly mounted in the housing 12, and the valve body 42 is resiliently urged against the valve ball 56 by a staged inverse proportioning valve spring 58 to seal the internal valve port 54 at the valve body trailing end 46. The staged inverse proportioning valve seat 55, ball 56, and spring 58 cooperating to form a staged inverse proportioning valve 59.

A stepped piston 60, having a leading end 62 and a trailing end 64, is disposed within the housing 12 and is slidable between an unstroked position and a stroked position. The stepped piston 60 has a leading piston portion 66 proximate its leading end 62 and a trailing piston portion 68 proximate its trailing end 68. The leading piston portion 66 is disposed within the main bore 14, defining a main pressurizing chamber 72 within the housing 12 between the leading end 62 of the piston 60 and the closed end 18 of the housing 12. The trailing piston portion 68, which has a greater diameter than does the leading piston portion 66, is disposed within the fast-fill bore 16. A fast-fill pressurizing chamber 74 is defined within the housing 12 between the trailing piston portion 68 and the lip seal 69 of leading piston portion 66. The stepped piston 60 is resiliently biased toward the open end 20 of the housing 12 by a piston spring 70, which is supported at each end in alignment with axis A by support member 75.

The leading piston portion 66 of the stepped piston 60 has a relief valve recess 76 therein extending from the leading end 62 of the stepped piston 60. The stepped piston 60 also has therein a bore 78 communicating between the fast-fill pressurizing chamber 74 and the recess 76. A valve seat 80 is formed at the point of intersection of the bore 78 with the recess 76. A check valve ball 82 is resiliently held against the check valve seat 80 by a check valve spring 84. The check valve seat 80, check ball 82, and check valve spring 84 cooperate to form a low restriction check valve 86. Alternatively, the check valve 86 and bore 78 could be eliminated and the lip seal 35 along serve as a low restriction check valve.

The leading piston portion 66 of the stepped piston 60 has a diameter slightly smaller than that of the main bore 14. A first leading piston seal 67, such as a lip seal, is disposed in an annular recess in the periphery of a portion of the leading piston portion 66 proximate the leading end 62. The first leading piston seal 67 prevents brake fluid from the main pressurizing chamber 72 from reaching the main inlet port 28 and the fast-fill pressurizing chamber 74 and from reaching the compensation port 24 when the stepped piston 60 is forced from its unstroked position.

A second leading piston seal 69, such as a lip seal, is disposed in an annular recess in the periphery of a portion of the leading piston portion 66 proximate the fast-fill pressurizing chamber 74 when the stepped piston is in its unstroked position. The second leading piston seal 69 prevents brake fluid from the fast-fill pressurizing chamber 74 from reaching the main inlet port 28, the compensation port 24 and the main pressurizing chamber 72.

The trailing piston portion 68 has a diameter slightly smaller than that of the fast-fill bore 16. A trailing piston seal 71, such as an O-ring, is disposed in an annular recess in the periphery of the trailing piston portion 68. The trailing piston seal 71 prevents brake fluid from the fast-fill pressurizing chamber 74 from escaping through the open end 20 of the housing 12. A device such as a retaining ring 73 disposed in an inner circumferential slot within the main bore 14 proximate the open end 20 of the housing 12 retains the stepped piston 60 within the main bore 14.

As mentioned in the Background of the Invention section herein, existing fast-fill master cylinder braking systems use a flow restriction valve as an alternate brake fluid flow path from the fast-fill pressurizing chamber to a brake fluid reservoir. This causes the pedal travel of existing fast-fill master cylinder braking systems to be a function of the rate at which braking force is applied to the pedal.

Applying pedal effort at a rate that does not allow sufficient time for brake fluid to flow through the flow restriction valve results in a rapid increase in brake fluid pressure and relatively little pedal travel. Conversely, if the rate pedal effort is applied slowly enough to allow all or an appreciable proportion of brake fluid to flow through the flow restriction valve, brake fluid pressure remains low, resulting in considerable pedal travel. In the fast-fill master cylinder of the present invention, no such flow restriction device is used. Therefore, the pedal travel is not a function of the rate at which pedal effort is applied.

As also mentioned, existing fast-fill master cylinder braking systems also use a relief valve between a fast-fill pressurizing chamber and a main pressurizing chamber of a master cylinder so that, after brake pads or shoes have been rapidly forced into contact with respective brake disks or drums and the increased brake fluid flow used to accomplish this is no longer needed, the pressure that is then rapidly increasing in the fast-fill pressurizing chamber, with its corresponding rapid increase in pedal effort, can be relieved.

Figure 2:
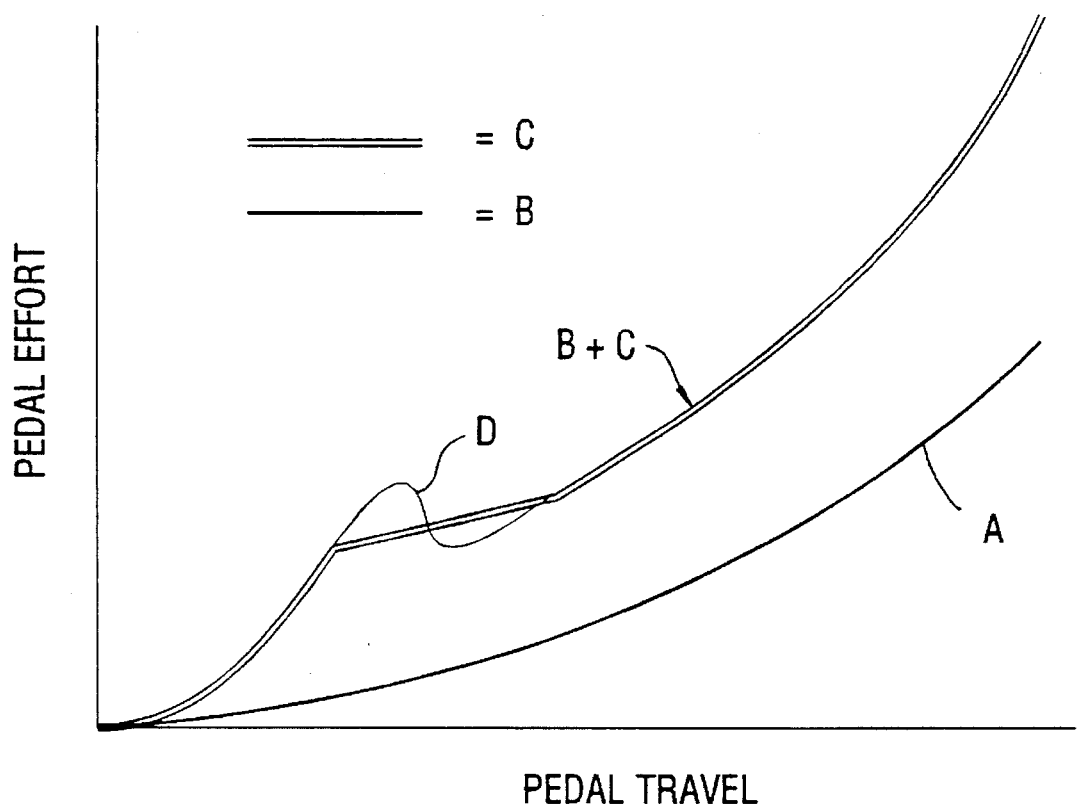
FIG. 2 is a graphic illustration of pedal effort versus pedal travel.

With these known fast-fill systems, when the relief valve opens, however, the brake fluid pressure and corresponding pedal effort are relatively high. The smooth increase in brake fluid pressure is interrupted, the rate of its increase being sharply reduced. Not infrequently, the pedal effort may actually decrease as pedal travel increases during this transition period, as shown at slope D, FIG. 2. This may result in an operator experiencing an inconsistent pedal feel during this period of transition from fast-fill pressurizing chamber to standard master cylinder pressurizing chamber fluid delivery. Following this period, the brake fluid pressure rises and provides a pedal feel approximating that of a braking system using a standard master cylinder. The possible inconsistency of pedal effort with respect to pedal travel for these known fast-fill systems is illustrated in FIG. 2 by line B, which illustrates a relatively fast apply rate. Line A represents the relationship between pedal effort and pedal travel of a standard master cylinder. At slower apply rates for known fast-fill systems, line B will approach or match that of line A.

In the fast-fill master cylinder 10 of the present invention, once the brake pads or shoes have been forced into contact with respective brake disks or drums the increased brake fluid flow used to accomplish this is no longer needed. Thereafter, whenever the brake fluid pressure resulting from brake fluid in the main pressurizing chamber and in the fast-fill pressurizing chamber attempting to flow into the staged inverse proportioning valve bore 30 overcomes the resistance of the staged inverse proportioning valve spring 58, the valve body 42 moves away from the valve ball 56, allowing brake fluid to vent through the internal valve port 54 and the reservoir return port 40 to the reservoir 26, thus maintaining a reduced rate of brake fluid pressure increase, and corresponding pedal effort. This continues until the brake pressure acting on the sealing area of lip seal 33 less the sealing area of lip seal 35, i.e. the pressure differential across the valve, is sufficient to overcome spring 58, thereby opening valve 59.

Once the staged increased proportioning valve 59 opens, the brake fluid pressure in the fast-fill pressurizing chamber 74 drops to atmospheric pressure, i.e. reservoir 26 pressure. The staged inverse proportioning valve body 42 is suspended with its seat off the ball, and braking continues with a pedal feel approximating that of a braking system using a standard master cylinder. The fast-fill master cylinder 10 of the present invention thus provides braking action having a smoother transition from fast-fill master cylinder pressurizing chamber flow to standard master cylinder pressurizing chamber flow. This improved pedal effort consistency is illustrated in FIG. 2 by line C.

When pedal effort is removed, the stepped piston 60 is urged toward the open end 20 of the housing 12 by the piston spring 70 and any brake fluid pressure present. The main pressurizing chamber 72 is refilled by brake fluid returning through the main outlet port 22. Any additional brake fluid compensation needed is made by way of the compensation port 24. The fast-fill pressurizing chamber 74 is refilled by brake fluid drawn from the reservoir 26 through the main inlet port 28 and past the second leading piston seal 69.

While the best mode for carrying out the invention has been described in detail, those familiar with the art to which this invention relates will recognize various alternative designs and embodiments for practicing the invention as defined by the following claims.

What is claimed is:

1. An apply-rate-independent fast-fill master cylinder, comprising:

an elongate housing having a main axis (A) and a valve axis (B), a closed end and an open end, the housing further having a stepped piston bore concentrically disposed along the main axis (A), the stepped piston bore including a main bore proximate the closed end and a fast-fill bore proximate the open end, the fast-fill bore having a larger diameter than the main bore, the housing also having a main inlet port and a compensation port, which are connectable to a brake fluid reservoir, and a main outlet port extending therethrough into the main bore, the housing also having a staged inverse proportioning valve bore, also stepped and concentrically disposed along the valve axis and including a first valve bore portion and a second valve bore portion, the first valve bore portion having a larger diameter than the second valve bore portion, and the housing also having a valve bore inlet port extending between the valve bore and the fast-fill bore, a valve bore outlet port extending between the valve bore and the main bore, and a reservoir return port extending between the valve bore and the reservoir;

a staged inverse proportioning valve body slidably disposed within the staged inverse proportioning valve bore, the valve body having a leading valve body portion disposed within the first valve bore portion, and a trailing valve body portion disposed within the second valve bore portion, the valve body also having an internal valve port extending concentrically therethrough along the valve axis, a valve body valve seat being formed at the location where the internal valve port exits the trailing valve body portion;

a staged inverse proportioning valve ball fixedly mounted in the housing proximate the valve body valve seat, the valve body being resiliently biased to urge the valve seat against the valve ball for isolating the valve bore inlet port from the reservoir return port;

a leading valve seal disposed circumferentially on the leading valve body portion for isolating the valve bore outlet port from the reservoir return port;

a trailing valve seal disposed circumferentially on the trailing valve body portion for isolating the valve bore inlet port from the valve bore outlet port;

a stepped piston slidably disposed within the stepped piston bore and having a leading piston portion disposed within the main bore, defining a main pressurizing chamber between the leading piston portion and the closed end of the housing, and a trailing piston portion disposed within the fast-fill bore, and defining a fast-fill pressurizing chamber between the trailing piston portion and the leading piston portion, the stepped piston 60 being resiliently biased toward the open end of the housing;

a first leading piston seal disposed circumferentially on the leading piston portion for isolating the main pressurizing chamber from the main inlet port and from the compensation port when the stepped piston 60 is displaced;

a second leading piston seal disposed circumferentially on the leading piston portion for isolating the fast-fill pressurizing chamber from the main inlet port; and a trailing piston seal disposed circumferentially on the trailing piston portion for isolating the fast-fill pressurizing chamber from the open end.

2. The invention as defined by claim 1, wherein the stepped piston is resiliently biased toward the open end of the housing by a piston spring.

3. An apply-rate-independent fast-fill master cylinder for use in urging brake fluid therefrom toward vehicle wheel slave cylinders to actuate hydraulic wheel brakes when pedal effort is applied to a brake pedal connected to the master cylinder, the master cylinder comprising:

main piston means for urging brake fluid to flow from the master cylinder under pressure that is a first function of pedal effort;

fast-fill piston means for urging additional brake fluid to flow from the master cylinder under pressure that is a second function of pedal effort, the main piston means and the fast-fill piston means including an elongate housing having a main axis (A) and a valve axis (B), a closed end and an open end, the housing further having a stepped piston bore concentrically disposed along the main axis (A), the stepped piston bore including a main bore proximate the closed end and a fast-fill bore proximate the open end, the fast-fill bore having a larger diameter than the main bore, the housing also having a main inlet port and a compensation port, which are connectable to a brake fluid reservoir, and a main outlet port extending therethrough into the main bore, the main piston means and the fast-fill piston means further including a stepped piston slidably disposed within the stepped piston bore and having a leading piston portion disposed within the main bore, defining a main pressurizing chamber between the leading piston portion and the closed end of the housing, and a trailing piston portion disposed within the fast-fill bore, and defining a fast-fill pressurizing chamber between the trailing piston portion and the leading piston portion, the stepped piston being resiliently biased toward the open end of the housing;

a staged inverse proportioning valve means for moderating the rate of increase in brake fluid pressure by venting brake fluid put under pressure by the fast-fill piston means when pressure communicated to the staged inverse proportioning valve by fluid put under pressure by the fast-fill piston means and by fluid put under pressure by the main piston means exceeds a specific level;

a first leading piston seal disposed circumferentially on the leading piston portion for isolating the main pressurizing chamber from the main inlet port and the fast-fill pressurizing chamber and from the compensation port when the stepped piston is displaced; and a second leading piston seal disposed circumferentially on the leading piston portion for isolating the fast-fill pressurizing chamber from the main inlet port.

4. The invention as defined by claim 3, wherein:

the first leading piston seal is a lip seal oriented to prevent brake fluid from flowing past it from the main pressurizing chamber; and the second leading piston seal is a lip seal oriented to prevent brake fluid from flowing past it from the fast-fill pressurizing chamber.

5. The invention as defined by claim 3, further including a low restriction valve comprising:

a valve recess defined within the leading piston portion and a low restriction valve bore communicating between the fast-fill pressurizing chamber and the valve recess, a valve seat being formed at the point of intersection of the low restriction valve bore and the valve recess;

a low restriction valve member; and a valve spring having a first end fixed within the valve recess and having a second end resiliently urging the low restriction valve member against the valve seat.

6. An apply-rate-independent fast-fill master cylinder for use in urging brake fluid therefrom toward vehicle wheel slave cylinders to actuate hydraulic wheel brakes when pedal effort is applied to a brake pedal connected to the master cylinder, the master cylinder comprising:

main piston means for urging brake fluid to flow from the master cylinder under pressure that is a first function of pedal effort;

fast-fill piston means for urging additional brake fluid to flow from the master cylinder under pressure that is a second function of pedal effort, the main piston means and the fast-fill piston means including an elongate housing having a main axis (A) and a valve axis (B), a closed end and an open end, the housing further having a stepped piston bore concentrically disposed along the main axis (A), the stepped piston bore including a main bore proximate the closed end and a fast-fill bore proximate the open end, the fast-fill bore having a larger diameter than the main bore, the housing also having a main inlet port and a compensation port, which are connectable to a brake fluid reservoir, and a main outlet port extending therethrough into the main bore, the main piston means and the fast-fill piston means further including a stepped piston slidably disposed within the stepped piston bore and having a leading piston portion disposed within the main bore, defining a main pressurizing chamber between the leading piston portion and the closed end of the housing, and a trailing piston portion disposed within the fast-fill bore, and defining a fast-fill pressurizing chamber between the trailing piston portion and the leading piston portion, the stepped piston being resiliently biased toward the open end of the housing; and a staged inverse proportioning valve means for moderating the rate of increase in brake fluid pressure by venting brake fluid put under pressure by the fast-fill piston means when pressure communicated to the staged inverse proportioning valve by fluid put under pressure by the fast-fill piston means and by fluid put under pressure by the main piston means exceeds a specific level;

wherein the elongate housing also has a staged inverse proportioning valve bore, also stepped and concentrically disposed along the valve axis and including a first valve bore portion and a second valve bore portion, the first valve bore portion having a larger diameter than the second valve bore portion, the housing also having a valve bore inlet port extending between the valve bore and the fast-fill bore, a valve bore outlet port extending between the valve bore and the main bore, and a reservoir return port extending between the valve bore and the reservoir; and wherein the staged inverse proportioning valve comprises:

a staged inverse proportioning valve body slidably disposed within the staged inverse proportioning valve bore, the valve body having a leading valve body portion disposed within the first valve bore portion, and a trailing valve body portion disposed within the second valve bore portion, the valve body also having an internal valve port extending concentrically therethrough along the valve axis, a valve body valve seat being formed at the location where the internal valve port exits the trailing valve body portion; and a staged inverse proportioning valve member 56 within the housing proximate the valve body valve seat; and a staged inverse proportioning valve spring disposed within the first valve bore portion to resiliently bias the valve seat against the valve member for isolating the valve bore inlet port from the reservoir return port.

7. The invention as defined by claim 6, further including:

a leading valve seal disposed circumferentially on the leading valve body portion for isolating the valve bore outlet port from the reservoir return port; and a trailing valve seal disposed circumferentially on the trailing valve body portion for isolating the valve bore inlet port from the valve bore outlet port.

8. The invention as defined by claim 7, wherein:

the leading valve seal is a lip seal oriented to prevent brake fluid from flowing past it to the reservoir return port; and the trailing valve seal is a lip seal oriented to prevent brake fluid from flowing past it to the valve bore inlet port.

9. The invention as defined by claim 6, further including a low restriction valve comprising:

a valve recess defined within the leading piston portion and a low restriction valve bore communicating between the fast-fill pressurizing chamber and the valve recess, a valve seat being formed at the point of intersection of the low restriction valve bore and the valve recess;

a low restriction valve member; and a valve spring having a first end fixed within the valve recess and having a second end resiliently urging the low restriction valve member against the valve seat.

\* \* \* \* \*